United States Patent
Halbinger et al.

(10) Patent No.: US 6,807,845 B2
(45) Date of Patent: Oct. 26, 2004

(54) MEASUREMENT APPARATUS AND PROCESS FOR DETERMINING THE POSITION OF AN OBJECT RELATIVE TO A REFERENCE SURFACE

(75) Inventors: Lorenz Halbinger, Waltershofen (DE); Benno Kathan, Wasserburg (DE); Alfred Wagner, Bodnegg (DE)

(73) Assignee: i f m electronic GmbH, Tettnang (DE)

( * ) Notice: Subject to any disclaimer, the term of this patent is extended or adjusted under 35 U.S.C. 154(b) by 0 days.

(21) Appl. No.: 10/270,081

(22) Filed: Oct. 15, 2002

(65) Prior Publication Data

US 2003/0079525 A1 May 1, 2003

(30) Foreign Application Priority Data

Oct. 12, 2001 (DE) .......................................... 101 50 221
Nov. 12, 2001 (DE) .......................................... 101 55 135

(51) Int. Cl.[7] .............................................. G01B 13/08
(52) U.S. Cl. ............................................ 73/37.5; 73/37
(58) Field of Search .................................... 73/37.5, 37

(56) References Cited

U.S. PATENT DOCUMENTS

| | | | | |
|---|---|---|---|---|
| 2,707,389 A | * | 5/1955 | Fortier ........................ | 73/37.5 |
| 3,400,573 A | * | 9/1968 | Matter ........................ | 73/37.5 |
| 3,863,493 A | | 2/1975 | Busenkell ................... | 73/37.5 |
| 4,195,446 A | * | 4/1980 | Angst .......................... | 451/253 |
| 4,594,881 A | * | 6/1986 | Imamura ..................... | 73/37.5 |
| 4,953,388 A | * | 9/1990 | Barada ........................ | 73/37.5 |
| 5,140,846 A | * | 8/1992 | DeCool et al. .............. | 73/37.5 |
| 5,228,328 A | * | 7/1993 | Razafimandimby et al. . | 73/37.5 |

FOREIGN PATENT DOCUMENTS

| | | |
|---|---|---|
| DE | 42 32 630 A1 | 3/1994 |
| DE | 43 44 264 A1 | 6/1994 |
| DE | 197 34 374 A1 | 2/1999 |
| DE | 20004783 A  * | 9/2000 |
| DE | 199 44 163 A1 | 4/2001 |
| EP | 0 380 967 A2 | 1/1990 |
| EP | 0 794 035 A1 | 9/1997 |

OTHER PUBLICATIONS

DIN 2271 "Pneumatic length measurement", Part 1 "Principles, Processes", Sep. 1976.
DIN 2271 "Pneumatic length measurement", Part 2 "Construction features of devices for the high pressure range," Apr. 1976.
DIN 2271-3 "Pneumatic length measurement," Part 3 "Features of devices for the high pressure range, Requirements, Testing," Feb. 2000.
DIN 2271 "Pneumatic length measurement," Part 4 "General data for application and examples," Nov. 1977, to literature references "Production Engineering 1" published by Cert. Teacher. Alfred Reichard, professor in Pforzheim 7, revised edition, pp. 46 to 50.
"New Innovations in Air Gauging and Control," Technology News International, Nov./Dec. 1999.
"System for Pneumatic–Electrical Control and Measurement" of Mawomatic Mayer Wonisch Mietzel GmbH, 59757 Arnsberg, no date.

* cited by examiner

Primary Examiner—Michael Cygan
(74) Attorney, Agent, or Firm—Nixon Peabody LLP; David S. Safran (57) ABSTRACT

A measurement apparatus for determining the position of an object relative to a reference surface, with a measurement nozzle, a reference nozzle, and a measurement device, the outlet opening of the measurement nozzle being located in the reference surface. A compressed air source provides air having a certain feed pressure so that the measurement device acquires one of three state variables: flow rate, pressure and speed of the air upstream of the measurement nozzle.

18 Claims, 7 Drawing Sheets

MEASUREMENT APPARATUS AND PROCESS FOR DETERMINING THE POSITION OF AN OBJECT RELATIVE TO A REFERENCE SURFACE

BACKGROUND OF THE INVENTION

1. Field of the Invention

The invention relates to a measurement apparatus and process for determining the position of an object relative to a reference surface, with at least one measurement nozzle, at least one reference nozzle, and at least one measurement device. The outlet opening(s) of the measurement nozzle(s) are located in the reference surface, and by way of a compressed air source air can be made available with a given feed pressure whereby the measurement device acquires one state variable or at least one of three state variables such as flow rate, pressure and speed of the air upstream of the measurement nozzle or measurement nozzles. In essence, the invention relates to pneumatic length measurement or pneumatic distance measurement or determination, the position of one object relative to a reference surface being regarded as the distance to be measured or determined.

2. Description of Related Art

Regarding the principles of pneumatic length measurement and the terminology used therein, the possible applications of pneumatic length measurement and the advantages associated with pneumatic length measurement, reference is made first of all to DIN 2271 "Pneumatic length measurement", Part 1 "Principles, Processes," September 1976, DIN 2271 "Pneumatic length measurement," Part 2 "Construction features of devices for the high pressure range," April 1976, DIN 2271-3 "Pneumatic length measurement," Part 3 "Features of devices for the high pressure range, Requirements, Testing," February 2000, and DIN 2271 "Pneumatic length measurement," Part 4 "General data for application and examples," November 1977, to literature references "PRODUCTION ENGINEERING I" published by Cert. Teacher. Alfred Reichard, professor in Pforzheim 7, revised edition, pages 46 to 50, and "New Innovations in Air Gauging and Control," "TECHNOLOGY NEWS INTERNATIONAL," November/December 1999, to the brochure "SYSTEM FOR PNEUMATIC-ELECTRICAL CONTROL AND MEASUREMENT" of Mawomatic Mayer Wonisch Mietzel GmbH, 59757 Arnsberg, and to the German patent disclosure document 42 32 630, German patent disclosure document 43 44 264, German patent disclosure document 197 34 374, German patent disclosure document 199 44 163, German Patent utility model 200 04 783, European Patent No. 0 380 967, European Patent No. 0 794 035 and U.S. Pat. No. 3,863,493.

In the pneumatic length measurement under consideration there are on the one hand series circuits, on the other networks, in the networks, those without bridges and those with bridges (compare DIN 2271, Part 1, Section 6 "Circuit", 6.1 "Series circuit" and 6.2 "Network", 6.2.1 "Network without bridge" and 6.2.2 "Network with bridge").

It is noted that the expression "measured value transducer" is also used for the expression "measurement nozzle" and the expression "zero setter" is also used for the expression "reference nozzle" (compare DIN 2271, part 2, Section 3 "Display Devices").

SUMMARY OF THE INVENTION

In accordance with the present invention, a measurement apparatus and process is provided, and by way of a compressed air source air with a specific feed pressure can be made available. Generally, the compressed air source is not a component of the measurement means under consideration, but is rather connected to an external compressed air source. This external compressed air source can be made such that it makes available air with the desired feed pressure relatively accurately and constantly over time. However, in the measurement apparatus in accordance with the invention, a filter is connected downstream of the compressed air connection, and also a pressure regulator (compare DIN 2271, Part 1, Section 3 "Measurement process" and Section 6 "Circuit") which makes available compressed air with a certain feed pressure relatively constantly over time within the measurement mechanism.

In pneumatic length measurement, with reference to the feed pressure, it is distinguished between high pressure and low pressure (compare DIN 2271, Part 1, Section 5 "Pressure ranges"), high pressure being defined here as a feed pressure of $\geq 0.5$ bar; low pressure being defined here as a feed pressure of $\leq 0.1$ bar. Preferably, high pressure is used in the above explained sense.

In accordance with the invention, the measurement apparatus includes a measurement device that acquires one state variable or at least one of the three state variables such as flow rate, pressure and speed of the air upstream of at least one measurement nozzle. Essentially, in pneumatic length measurement, the dimension change, the change of the distance of the object to the reference surface, i.e., the gap change, is converted into a change in the flow rate and is detected (compare DIN 2271, Part 1, Section 3 "Measurement process"). Here we distinguish between (a) the process of measuring the flow rate in which the change in the flow rate is directly detected, (b) the pressure measurement process in which the change of flow rate is converted via a preliminary nozzle into a pressure change which is then detected, and (c) the speed measurement process in which the change of the flow rate is converted by a suitable throttle (Venturi nozzle) into a speed change which yields a pressure difference which is detected.

While therefore for the application of the flow rate measurement process only one measurement nozzle and one measurement device which detects the change of flow rate are required, for the application of the pressure measurement process and for the application of the speed measurement process, at least one additional part at a time is required, specifically, in the pressure measurement process at least one preliminary nozzle and in the speed measurement process, at least one suitable throttle (Venturi nozzle).

Several measurement nozzles can be used for the measurement means under consideration and in the process under consideration (parallel circuit (summation circuit) of measurement nozzles, compare DIN 2271, Part 1, Subsection 6.2.3, with FIG. 8). Only one measurement nozzle is ever assumed below; likewise embodiments will always be encompassed which work with several measurement nozzles, in which therefore a parallel circuit (summation circuit) of measurement nozzles is implemented.

Within the framework of the invention, a measurement device can be used which detects one of the three state variables: flow rate, pressure and speed of the air in front of the measurement nozzle. However, several measurement devices can also be implemented which all detect either the same state variable, thus, the flow rate, the pressure, or the speed, or detect different state variables. Therefore, a first measurement device detects the state variable flow rate and the second measurement device the state variable pressure, or the first measurement device the state variable flow rate and the second measurement device the state variable speed, or the first measurement device the state variable pressure and the second measurement device the state variable speed, or the first measurement device the state variable flow rate, the second measurement device the state variable pressure and the third measurement device the state variable speed. It is always assumed below that there is only one measurement device which detects one of the three state variables flow rate, pressure and speed; likewise embodiments will always be encompassed which work with several measurement devices.

While the aforementioned DIN 2271 is referred as "Pneumatic length measurement," the focus is on determination of the position of an object relative to a reference surface and it is stated that measurement device "detects" one state variable or the measurement devices "detect" at least one of the three state variables: flow rate, pressure and speed of the air in front of the measurement nozzle or the measurement nozzles. This difference in terminology has the following justification.

"Measurement" could be defined as proportional detection of the distance of an object relative to the reference surface. But the invention is not limited to this proportional detection, which could also be called "measurement in the narrower sense." Rather, within the framework of the invention it can be sufficient if the position of the object relative to a reference surface is determined only to the extent that information can be obtained about whether the distance of the object to the reference surface is greater than or less than a given boundary value. This detection could also be called "measurement in a broader sense" as well.

In the pneumatic length measurement under consideration there are various circuits, especially a circuit "network with bridge." If the aforementioned pressure measurement process is accomplished with the circuit "network with bridge" and a difference pressure measurement device is used as the measurement device (compare DIN 2271, Part 1, Subsection 6.2.2), the difference between the pressure in the measurement branch, i.e., pressure between a preliminary measurement nozzle and the measurement nozzle, and the pressure in the reference branch, i.e., pressure between the preliminary reference nozzle and the reference nozzle, is detected as the difference pressure. Under the assumptions that the measurement nozzle and the reference nozzle are identical in terms of flow engineering, therefore having the same outlet openings, and that the reference surface assigned to the measurement nozzle and the reference surface assigned to the reference nozzle are identical in terms of flow engineering, at the same distance between the measurement nozzle and the reference surface on the one hand and between the reference nozzle and the reference surface on the other the difference pressure is zero.

The above explained pressure measurement process in a network with a bridge has especially two advantages. On the one hand, the difference between the measurement nozzle-reference surface distance and the reference nozzle-reference surface distance can be detected especially well. On the other hand, changes of the feed pressure, in any case within certain limits, remain without any influence on the measurement result, therefore, on the determination of the distance between the measurement nozzle and the reference surface.

A measurement apparatus which works using the pressure measurement process and in which there is a network with a bridge is always treated below. Likewise all other embodiments will also be encompassed, therefore especially also the flow rate measurement process and the speed measurement process.

The possible applications of pneumatic length measurement to which the invention relates are diverse (compare DIN 2271; Part 4, Section 3 "Instructions for use" and Section 4 "Application examples," the literature citation "PRODUCTION ENGINEERING 1" loc. cit., page 50, and the brochure "SYSTEM FOR PNEUMATIC-ELECTRICAL CONTROL AND MEASUREMENT," loc. cit., pages 7 and 20). Especially important possible applications of pneumatic length measurement are proximity monitoring and seating monitoring. For seating monitoring on a clamping device (some, production machine or machine tool) there is the problem of monitoring proximity or correct seating of the workpiece in the clamping means; if the seating of the workpiece at a certain point is no long ensured, the clamping device will not be able to be activated.

Since conventional measurement apparatus cannot be used as comprehensively as is desired by the user or potential user, the object of the invention is to embody and develop the measurement apparatus such that within wide ranges, i.e., for as many applications as possible, it can be easily and especially simply used.

The measurement apparatus in accordance with the invention is characterized in that the effective outlet surface (annular gap surface) of the reference nozzle can be adjusted in increments or continuously. (For what is meant by effective outlet surface, annular gap surface of the reference nozzle, reference is made to DIN 2271, Part 1, Section 2 "Physical principle"). Because in the measurement apparatus in accordance with the invention, the effective outlet surface (annular gap surface) of the reference nozzle can be adjusted in increments or continuously, both a "measurement in the broader sense" and a "measurement in the narrower sense" can be taken. Therefore, the measurement apparatus allows both information about whether the distance of the object to the reference surface is greater than or less than a given boundary value (or corresponds exactly to the boundary value) and also measurement of this distance without reference to a boundary value, therefore a "measurement in the narrower sense."

As previously mentioned, it can be necessary for either the compressed air source to make available air with a desired feed pressure, relatively accurately and constantly over time, or a pressure regulator can be provided for making available air with a certain feed pressure relatively constantly over time.

In accordance with the invention, the necessity of making available air with a certain feed pressure relatively constantly over time can be qualified if the feed pressure of the compressed air made available by the compressed air source is measured and delivered to the measurement device as a reference, control and/or correction value.

To date it has always been assumed that the measurement device acquires one state variable or the measurement devices acquire at least one of the three state variables, flow rate, pressure and speed of the air upstream of the measurement nozzle or measurement nozzles. According to another teaching of the invention, it can be provided that the measurement device does not acquire one state variable, or the measurement devices do not acquire at least one of the three state variables, flow rate, pressure and speed of the air upstream of the measurement nozzle or measurement nozzles, but rather the time change of one or at least one of the three state variables flow rate, pressure and speed of the air upstream of the measurement nozzle or measurement nozzles. If one or at least one of the three state variables, flow rate, pressure and speed of the air upstream of the measurement nozzle or measurement nozzles is detected, it can take a relatively long time, roughly 400 ms to 2000 ms before a stable end value is reached, specifically due to the compressibility of air and especially when the volume of the system is relatively large. If the time change of one or at least one of the three state variables flow rate, pressure and speed of the air upstream of the measurement nozzle or measurement nozzles is detected, the required measurement time can be greatly reduced, for example, to roughly 50 ms.

Otherwise, it has always been assumed so far that the invention relates to pneumatic length measurement or pneumatic distance measurement or determination, therefore, air is used. Instead of using air, however, liquids such as cooling or lubricating liquids an also be used. In this regard, instead of pneumatic operation, hydraulic operation is also possible.

In particular there are various possibilities for embodying and developing the measurement apparatus and process of the present invention.

DETAILED DESCRIPTION OF THE INVENTION

In accordance with the present invention, a pneumatic length measurement apparatus is provided, for which reference should be made to the statements detailed above, especially to DIN 2271 "Pneumatic length measurement," Part 1, Part 2, Part 3, and Part 4, and to the literature citation "PRODUCTION ENGINEERING 1," loc. cit.

Figure 1:
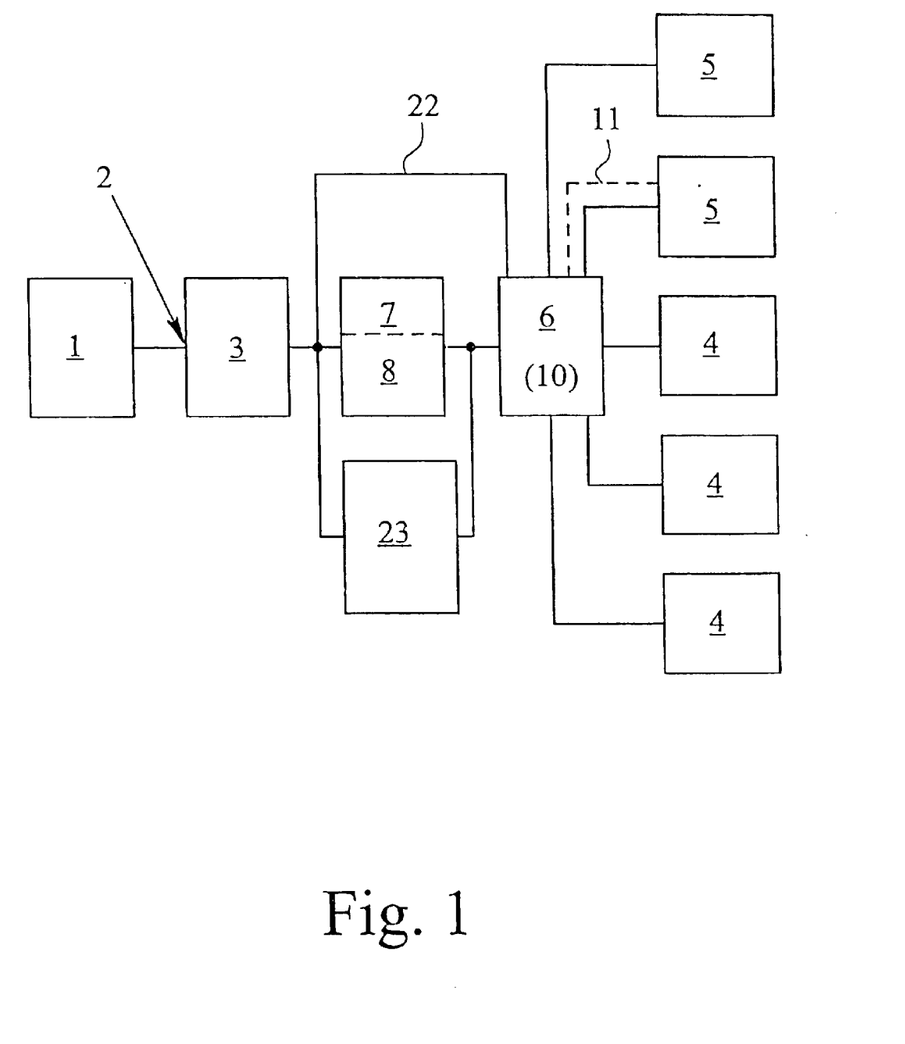
FIG. 1 shows a block diagram for explaining the measurement apparatus and process in accordance with the present invention.

As shown in FIG. 1, the pneumatic length measurement apparatus includes a compressed air source 1. This compressed air source 1 is not a component of the measurement apparatus, but is rather connected to the externally present compressed air source 1. The compressed air source 1 can be made such that it makes available air with a desired feed pressure relatively accurately and constantly over time. But generally in the measurement apparatus of the present invention, there is a pressure regulator 3 connected downstream of the compressed air connection 2 and behind a filter which is not shown. The pressure regulator 3 makes air with the desired feed pressure available relatively constantly over time.

As shown in FIG. 1, the measurement apparatus also includes a measurement nozzle 4, a reference nozzle 5, and a measurement device 6. The measurement apparatus is used for determining the position of an object (not shown) relative to a reference surface (not shown) individually and for determining or for measuring the distance between the object and the reference surface. The outlet opening of the measurement nozzle 4 individually is located in the reference surface, expressed otherwise, this means that the outlet opening of the measurement nozzle 4 represents the reference surface. The measurement apparatus is therefore used for determining the position of an object, for example, a workpiece in a clamping device (some production machine or machine tool).

In the measurement apparatus, the measurement device 6 detects one of three state variables, inflow, pressure and speed of the air in front of the measurement nozzle 4. As stated above, the measurement device 6 can also be made such that it detects the time change of one of the three state variables inflow, pressure and speed of the air in front of the measurement nozzle 4. The position of the object relative to the reference surface, i.e., relative to the measurement nozzle 4, or the distance between the object and the reference surface, i.e., the measurement nozzle 4, determines the flow rate of air through the measurement apparatus. A change of the distance of the object to the reference surface or to the measurement nozzle 4 (gap change, DIN 2271, Part 1, Section 3 "Measurement process") leads to a change of the flow rate. This change of flow rate is detected either directly (flow rate process) or detected and converted, specifically converted either into a pressure change (pressure measurement process) or converted into a speed change (speed measurement process). Embodiments of the measurement apparatus which work using the pressure measurement process are shown. As already stated, the measurement apparatus includes a reference nozzle 5. The circuit which has been implemented is therefore a "network with bridge" (compare DIN 2271, Part 1, Subsection 6.2.2, "Network with bridge").

Figure 2:
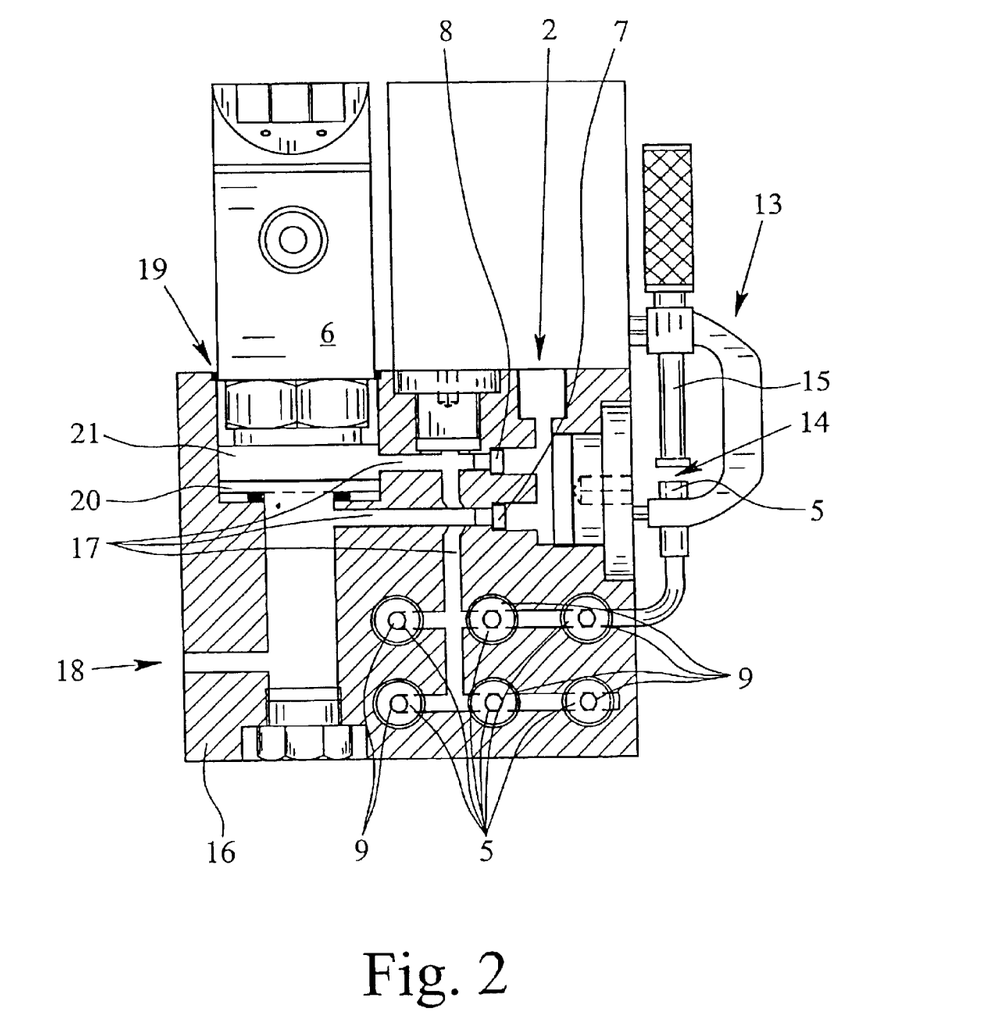
FIG. 2 schematically shows a first embodiment of a measurement apparatus in accordance with the present invention.
Figure 3:
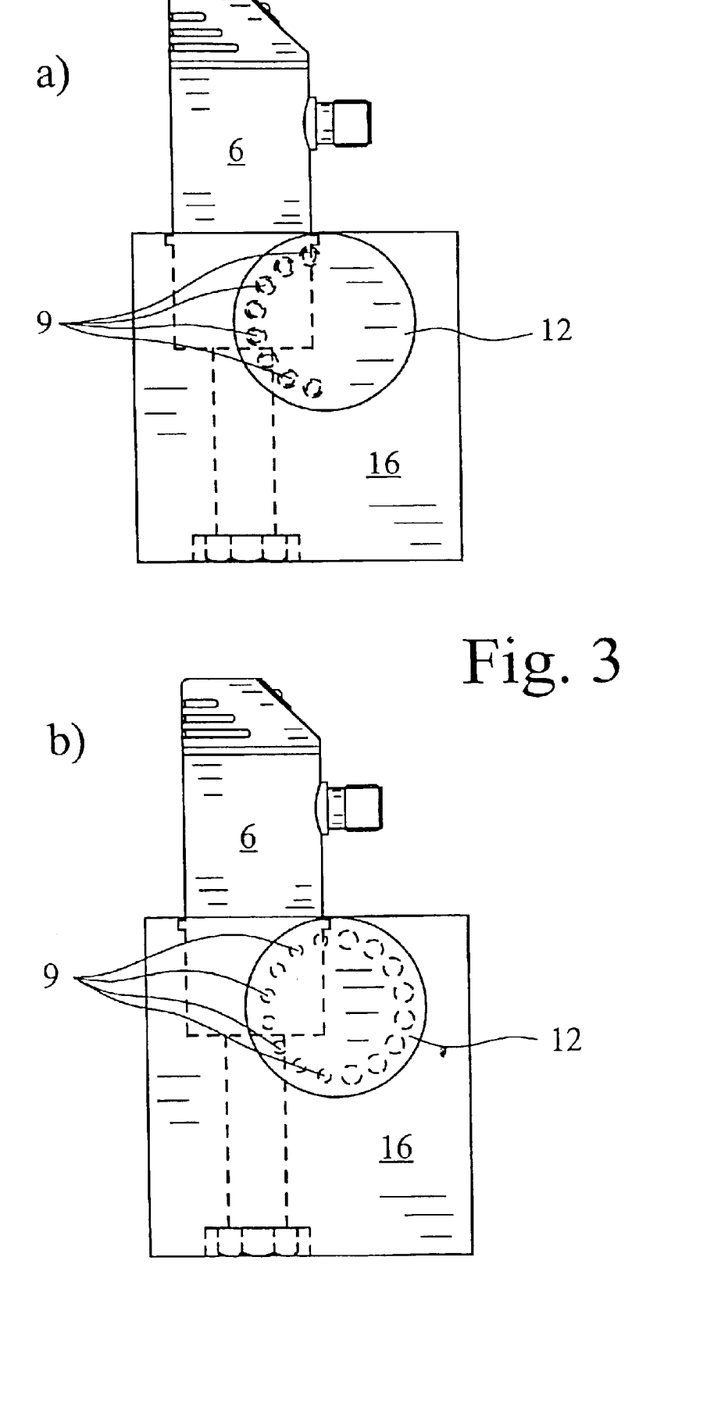
FIG. 3 shows a schematic of a measurement apparatus in accordance with a second embodiment of the present invention.

Since in the measurement apparatus the pressure measurement process is used, and in terms of circuitry a "network with bridge" is implemented, the measurement apparatus also includes two preliminary nozzles, specifically one measurement pre-nozzle 7 and one reference pre-nozzle 8. In the measurement apparatus, the effective outlet surface, therefore the annular gap surface, of the reference nozzle 5 can be adjusted in increments or continuously. FIGS. 2 and 3 shows embodiments in which the effective outlet surface is adjustable in increments.

In the embodiments of the measurement apparatus shown in FIGS. 2 to 7, the measurement device 6 is connected directly to the measurement block 16. Conversely, FIG. 8 shows one embodiment of the measurement apparatus in which the measurement device 6 is not connected directly to the measurement block 16, but via the connecting line 27 to the measurement block 16.

As already stated, in the embodiment shown in FIG. 2 there are six individual nozzles 9 which are located parallel to one another in terms of flow engineering. Depending upon how many individual nozzles 9 are activated and adjusted with which effective outlet surface, the overall effective outlet surface (annular gap surface) of the reference nozzle 5 arises.

In the embodiment shown in FIG. 3, there are eight individual nozzles 9 arranged in an arc or a semi-circle. A circular reference disk 12 which rotates around the center of the circle, with reference surfaces which correspond to the individual nozzles 9 and (not shown), is assigned to the individual nozzles 9. By way of incremental rotation of the reference disk 12 the overall effective outlet surface (annular gap surface) of the reference nozzle 5 formed overall by the individual nozzles 9 can be adjusted. With reference to the position of the reference disk 12 is shown for which all individual nozzles 9 are active. Regarding the position of the reference disk 12 is shown for which all individual nozzles 9 are closed.

As in the embodiment shown in FIG. 2, in the embodiment shown in FIG. 3 the individual nozzles 9 which overall form the reference nozzle 5 also have the same or different effective outlet surfaces. Different effective outlet surfaces can be implemented either by different diameters of the outlet openings of the individual nozzles 9 or by different distances of the reference surfaces of the reference disk 12 (not shown) to the outlet openings of the individual nozzles 9.

In accordance with the invention, the creation of effective and adjustable outlet surfaces (annular gap surface) of the reference nozzle 5 is accomplished, as shown in FIG. 2, by the reference nozzle 5 being implemented in conjunction with an external screw type micrometer 13. Specifically, in the anvil 14 of the external screw type micrometer 13 is the reference nozzle 5 and the spindle 15 of the external screw type micrometer 13 is provided with a reference surface. Various reference nozzles 5, i.e., reference nozzles 5 with different outlet openings, can be inserted into the external screw type micrometer 13, preferably into its anvil 14. The effective outlet surface (annular gap surface) of the reference nozzle 5 can be implemented both by the distance between the outlet opening of the reference nozzle 5 and the reference surface and also by reference nozzles 5 with different outlet openings. Thus, the aforementioned implementation of the reference nozzle 5 in conjunction with the external screw type micrometer 13 makes it possible to adjust the effective outlet surface (annular gap surface) of the reference nozzle 5 both in increments by reference nozzles 5 with different outlet openings, and also continuously by adjusting the spindle 15.

The reference nozzle 5 in conjunction with the external screw type micrometer 13 can be implemented in and of itself, but also, as shown in FIG. 2, in conjunction with the individual nozzles 9 described farther above.

While not shown, the external screw type micrometer 13 can be provided with scaling and/or a grid. This makes it possible to accurately adjust the reference nozzle 5 which has been implemented in conjunction with the external screw type micrometer 13 and/or to read the set value and/or ensure that the set and/or read value does not change without intentional action.

As shown in FIGS. 2 and 3, in conjunction with the measurement apparatus of the present invention, a measurement block 16 is implemented and within the measurement block 16 the necessary flow paths 17 are implemented.

As shown FIG. 2, the measurement nozzle 4 can be connected to the measurement block 16, the measurement block 16 is therefore provided with a measurement nozzle connection 18. While not shown, it is also possible to make the measurement nozzle 4 as an integral part of the measurement block 16. The reference nozzle 5 or the individual nozzles 9 of the reference nozzle 5 is or are an integral part of the measurement block 16. FIG. 2 shows that the external screw type micrometer 13 is flanged to the measurement block 16.

In the embodiments of the measurement apparatus shown in FIGS. 2 and 3, the measurement block 16 is provided with a measurement device receiver 19. While not shown, the measurement device receiver 19 of the measurement block 16 has an acceptance thread and the measurement device 6 with a screw-in thread which corresponds to the acceptance thread of the measurement device receiver 19 can be screwed into the measurement device receiver 19 of the measurement block 16.

As already explained above, in the measurement apparatus, the pressure measurement process is implemented with the circuit "network with bridge," and thus, the measurement device 6 is made as a difference pressure measurement device. In particular, the measurement block 16 is made such that after inserting the measurement device 6 into the measurement device receiver 19 the two measurement chambers 20, 21 of the measurement device 6 are directly connected on the one hand to the measurement branch and on the other to the reference branch. In the measurement chamber 20 the pressure in the measurement branch, i.e., pressure between the measurement pre-nozzle 7 and the measurement nozzle 4 prevails, while in the measurement chamber 21 the pressure in the reference branch, i.e., pressure between the reference pre-nozzle 8 and the reference nozzle 5 prevails.

It otherwise applies to the embodiments of the measurement apparatus shown in FIG. 2 that the measurement chambers 20, 21 of the measurement device 6 are outside the flow paths 17 implemented in the measurement block 16. This means that in the measurement chambers 20, 21 of the measurement device 6 the aforementioned pressures prevail, but the air flowing through the measurement apparatus does not flow via the measurement chambers 20, 21, so that the measurement chambers 20, 21 of the measurement device 6 largely "remain protected" from dirt which may be present in the air flowing through.

As stated above, the necessity of making available air with a certain feed pressure relatively constantly over time can be qualified if in accordance with another teaching of the invention, the feed pressure of the air made available by the compressed air source 1 or the feed pressure following the pressure regulator 3 is measured and is delivered to the measurement device 6 as a reference, control and/or correction value. This is indicated in FIG. 1 by a connecting line 22 with which the feed pressure following the pressure regulator 3 is delivered into the measurement device 6. Thus, in this embodiment the feed pressure of the air made available by the compressed air source 1 or the feed pressure following the pressure regulator 3 is measured in the measurement device 6. The measurement device 6, therefore, has this additional function, in addition to the actual functions of a measurement device. While not shown, it is also possible to measure the feed pressure of the air made available by the compressed air source 1 or the feed pressure following the pressure regulator 3 with a separate measurement device and then to deliver this measured value electrically as a reference, control and/or correction value to the measurement device 6.

In the measurement apparatus of the present invention, the measurement device 6, in addition to its actual measurement function, can also be made in a special way as a display device, optionally also in addition to the above explained function. First of all, the result of the actual "measurement" can be displayed; in doing so, as explained above, it can be a "measurement in the narrower sense" and/or a "measurement in the broader sense". In addition to display of the result of the "measurement" or in addition to it, there is of course also the possibility that the measurement device 6 makes available the result of the "measurement" as an electrical signal for purposes of further processing elsewhere.

Another teaching of the invention acquires special importance; it is characterized in that the measurement device 6 is also used to detect and display the effective outlet surface of the reference nozzle 5 implemented in the apparatus. The possibility of being able to read the implemented effective outlet surface of the reference nozzle 5 on the measurement device 6 greatly facilitates working with the measurement means as claimed in the invention. As for the result of the actual "measurement" it also applies to the detection of the effective outlet surface of the reference nozzle 5 by the measurement device that an electrical signal can also be made available here and is then processed elsewhere.

It has also be recognized that for the measurement apparatus and process in the present invention, it is advantageous if the ratio of the air pressure in front of the measurement nozzle 4 and the reference nozzle 5 or in front of the measurement nozzle 4 to the feed pressure is between 0.65 and 0.8, preferably between 0.72 and 0.74. To be able to set this ratio, in the embodiment shown in FIG. 1, between the output of the pressure regulator 3 and the input of the measurement device 6, therefore parallel to the measurement pre-nozzle 7 and the reference pre-nozzle 8, there is an equalization throttle 23.

Otherwise, it should be pointed out that in FIG. 1 three measurement nozzles 4 and two reference nozzles 5 are shown. In the measurement apparatus, on the one hand several measurement nozzles 4 can be connected parallel (compare DIN 2271, Part 1, Subsection 6.2.3 "Parallel circuit"), on the other hand instead of the "actual" measurement nozzle 4 or in addition to it, there can be a special measurement nozzle 4 which includes individual nozzles which are not shown, also for comparison purposes, and/or an adjustable measurement nozzle 4, for example, with an external screw type micrometer, the latter likewise also for comparison purposes. The two reference nozzles 5 which are shown in FIG. 1 can be the same as those which are shown in FIG. 2, specifically, sometimes implemented by several individual nozzles 9, or sometimes implemented in conjunction with an external screw type micrometer 13.

Figure 4:
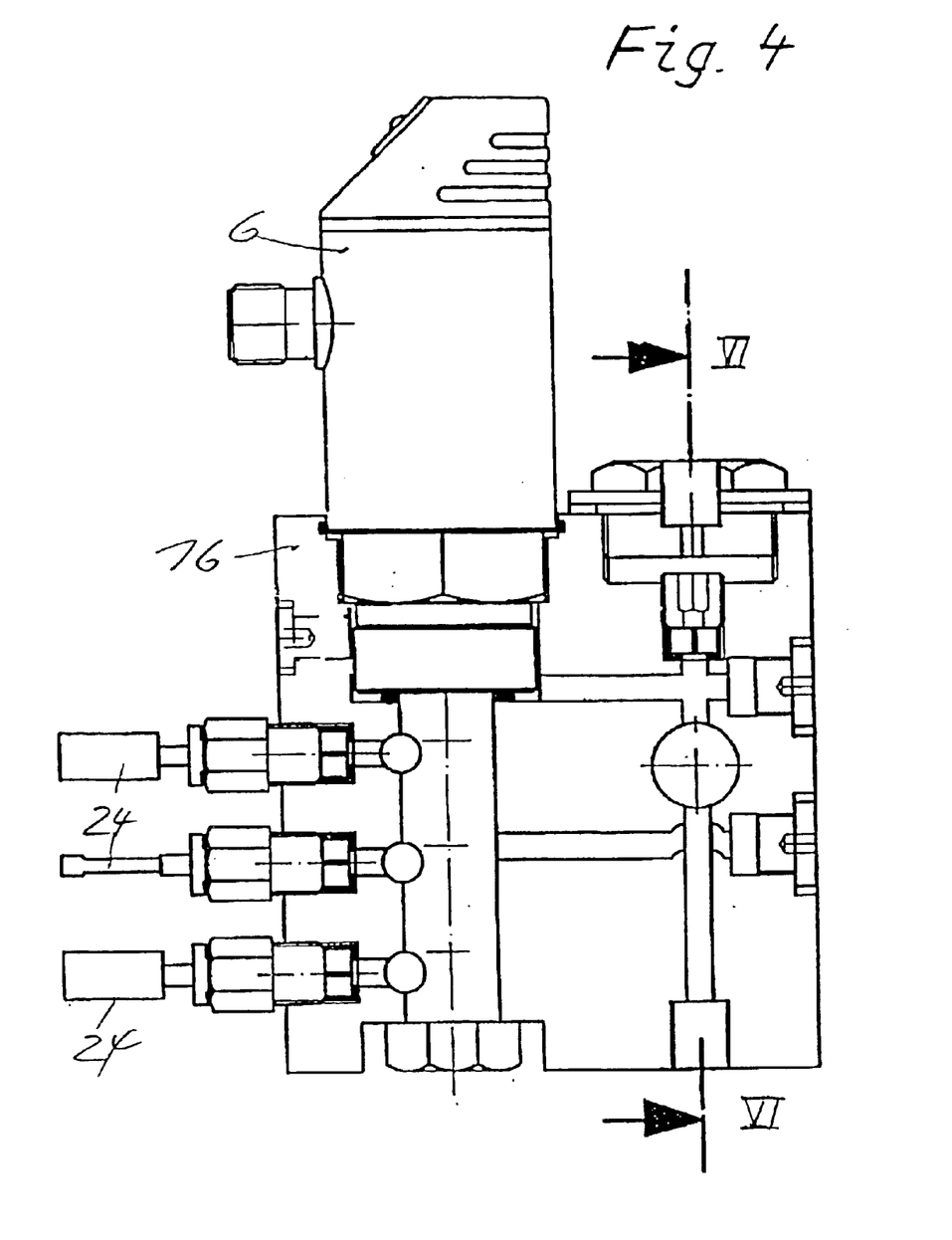
FIG. 4 shows a representation of a measurement apparatus in accordance with a third embodiment of the invention which corresponds to FIG. 2.
Figure 5:
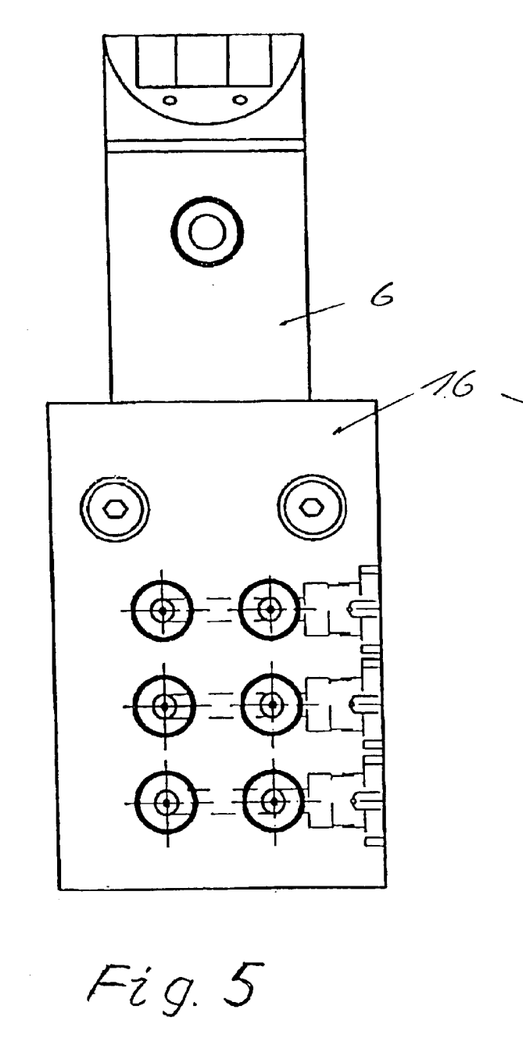
FIG. 5 shows a representation of the measurement apparatus as shown in FIG. 4 shifted by 90°.
Figure 6:
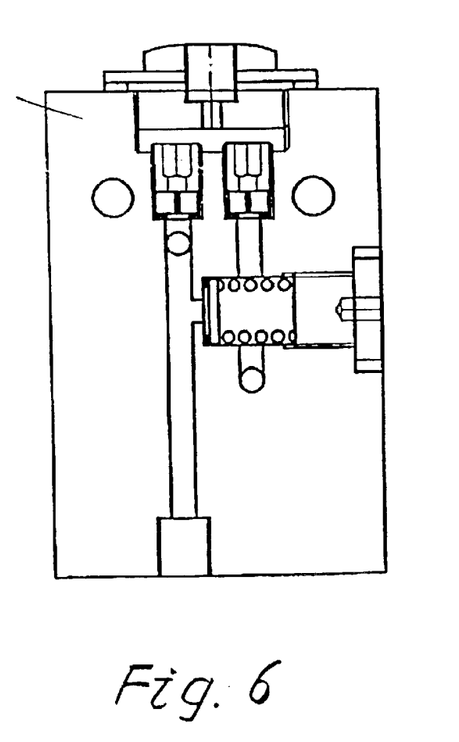
FIG. 6 shows a section through the measurement apparatus as shown in FIG. 4 along line VI—VI.
Figure 7:
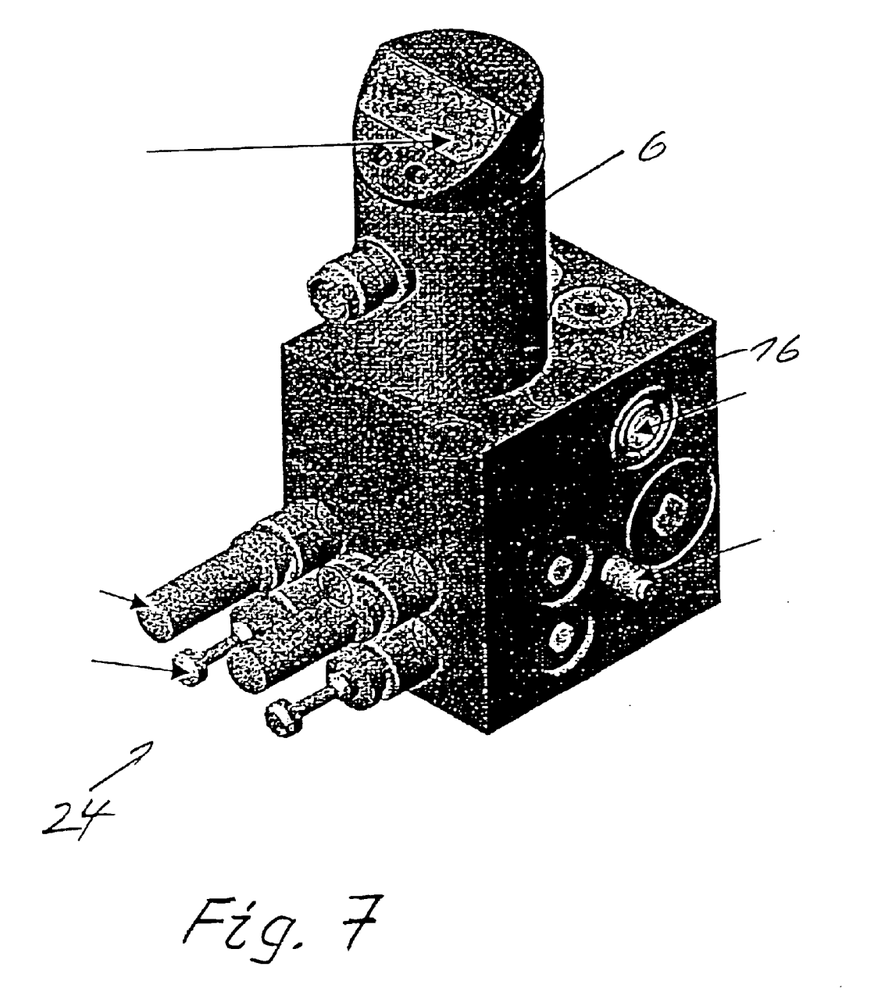
FIG. 7 shows in perspective view a apparatus in accordance with a fourth embodiment of the present invention.
Figure 8:
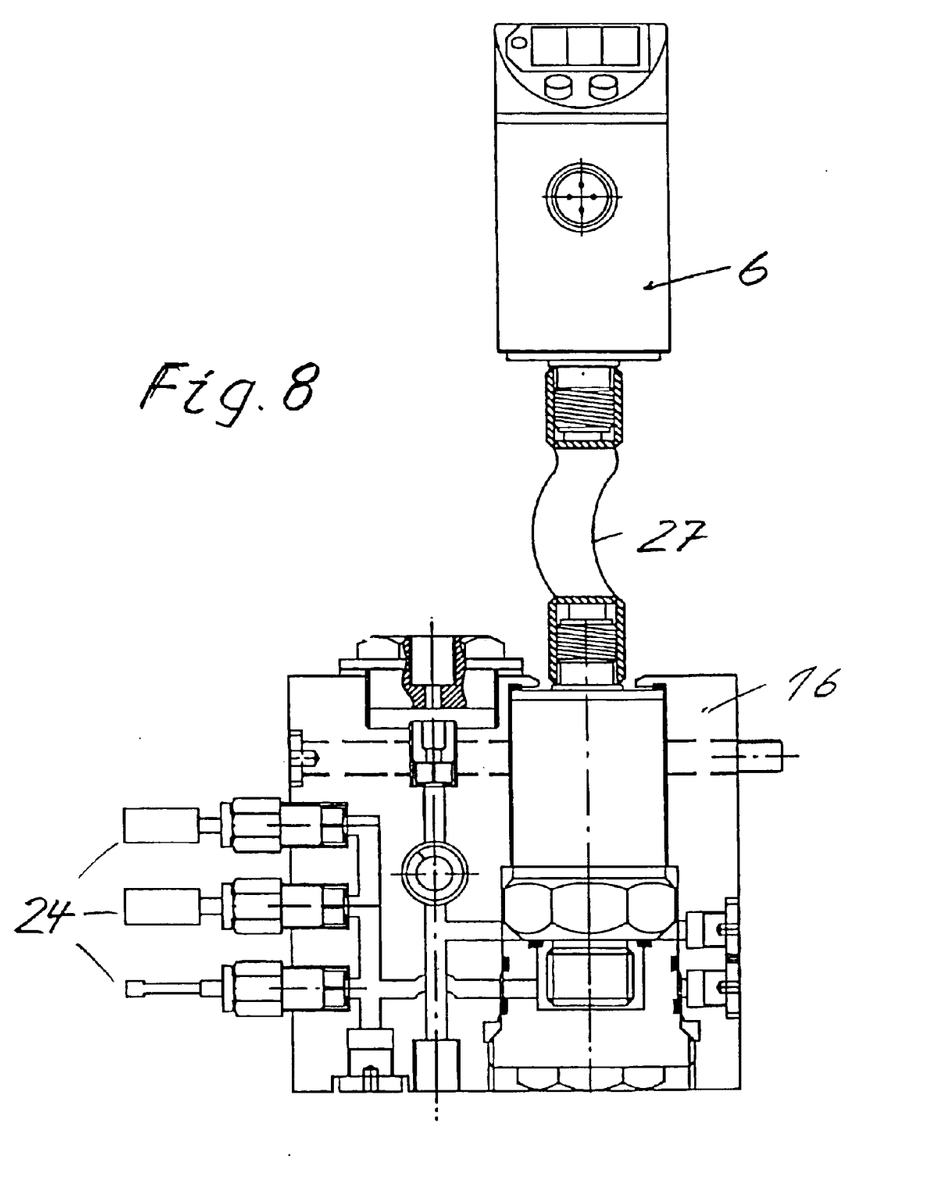
FIG. 8 shows a schematic of a measurement apparatus in accordance with a fifth embodiment of the present invention.

The embodiments of the measurement apparatus shown in FIGS. 4 to 8 correspond essentially to the embodiment which is schematically shown in FIG. 2. Here FIGS. 4, 7 and 8 show, as is not shown in FIG. 2, that the individual nozzles can be manually set, therefore can be opened or closed. To do this there are actuating elements 24 which make it possible to easily detect whether the respective individual nozzle 9 is open or closed. In the embodiment shown in FIG. 4 the upper and the lower individual nozzles 9 are closed, while the middle individual nozzle 9 is opened. In the embodiment as shown in FIG. 8 the two upper individual nozzles 9 are closed and the lower individual nozzle 9 is open.

In the embodiments of the measurement apparatus shown in FIGS. 2 to 7, the measurement device 6 is connected directly to the measurement block 16. Conversely, FIG. 8 shows one embodiment of the measurement apparatus in which the measurement device 6 is not connected directly to the measurement block 16, but via the connecting line 25 to the measurement block 16.

What is claimed is:

1. A measurement apparatus for determining the position of an object relative to a reference surface, said measurement apparatus comprising:

at least one measurement nozzle, said at least one measurement nozzle having an outlet opening located in a reference surface;

at least two reference nozzles;

at least one measurement device, said at least measurement device being adapted to acquire one state variable of flow rate, pressure and speed of the air upstream of said at least one measurement nozzle;

a compressed air source for providing air at a certain feed pressure, wherein an effective outlet surface of at least one of said at least two reference nozzles is adjustable incrementally and the effective outlet surface of at least another one of the at least two reference nozzles is adjustable continuously; and wherein at least one of at least one reference nozzle that is adjustable incrementally comprises a plurality of individually actuated nozzles, said plurality of individually actuated nozzles having different effective outlet surfaces.

2. The measurement apparatus as claimed in claim 1, wherein said effective outlet surfaces of said plurality of nozzles are stepped in a ratio of 1:2 to obtain a binary system.

3. The measurement apparatus as claimed in claim 2, wherein said plurality of nozzles are arranged in semi circle.

4. The measurement apparatus as claimed in claim 3, further comprising a circular reference disk which is assigned to said plurality of nozzles, said circular reference disk being adapted to rotate around the center of the semi circle, said circular reference disk having reference surfaces which correspond to said plurality of nozzles such that incremental rotation of said circular reference disk results in adjustment of said overall effective outlet surface of said plurality of nozzles.

5. The measurement apparatus as claimed in claim 4, wherein said plurality of nozzles are implemented in conjunction with an external screw type micrometer.

6. The measurement apparatus as claimed in claim 4, wherein said external screw type micrometer is provided with scaling and/or a grid.

7. The measurement apparatus as claimed in claim 6, wherein said external screw type micrometer includes a spindle and an anvil, said anvil serving as a reference nozzle and said spindle being provided with a reference surface.

8. The measurement apparatus as claimed in claim 7, wherein said reference nozzle has different outlet openings and is adapted to be inserted into said anvil of said external screw type micrometer.

9. The measurement apparatus as claimed in claim 8, further comprising a measurement block that is connected to said at least one measurement nozzle, said measurement block having a plurality of flow paths therein for permitting flow of a fluid.

10. The measurement apparatus as claimed in claim 9, wherein said at least one measurement nozzle forms an integral part of the measurement block.

11. The measurement apparatus as claimed in claim 9, wherein said plurality of nozzles form an integral part of said measurement block.

12. The measurement apparatus as claimed in claim 9, wherein said external screw type micrometer is attached to said measurement block.

13. The measurement apparatus as claimed in claim 12, wherein said measurement block includes a measurement device receiver, said measurement device receiver having an acceptance thread, and said at least one measurement device having a screw-in thread which corresponds to and is received by said acceptance thread of said measurement device receiver (19).

14. The measurement apparatus as claimed in claim 13, wherein said at least one measurement device comprises a difference pressure measurement device provided with two measurement chambers, wherein after inserting said at least one measurement device into said measurement device receiver, said two measurement chambers are directly connected on one hand to a measurement branch and on the other hand to a reference branch.

15. The measurement apparatus as claimed in claim 14, wherein said measurement chambers are located outside the flow paths of said measurement block.

16. The measurement apparatus as claimed in claim 15, wherein said at least one measurement device is also used to detect and display the effective outlet surface of said plurality of nozzles.

17. The measurement apparatus as claimed in claim 16, wherein said at least one measurement device has a display for displaying the implemented effective outlet surface of said plurality of nozzles.

18. The process as claimed in claim 17, wherein the ratio of the air pressure in front of said measurement nozzle and said reference nozzle or in front of said measurement nozzle to the feed pressure is between 0.65 and 0.8.

* * * * *